US009093755B2

(12) United States Patent
Faxvog et al.

(10) Patent No.: US 9,093,755 B2
(45) Date of Patent: Jul. 28, 2015

(54) LOWER POWER LOCALIZED DISTRIBUTED RADIO FREQUENCY TRANSMITTER

(75) Inventors: Frederick R. Faxvog, Long Lake, MN (US); David Blake Jackson, Excelsior, MN (US); Greg Fuchs, River Falls, WI (US); Gale Nordling, Excelsior, MN (US); Brian Groh, Prior Lake, MN (US); Wallace Jensen, Centerville, MN (US); James Nicholas Ruehl, Excelsior, MN (US)

(73) Assignee: Emprimus, LLC, St. Louis Park, MN (US)

( * ) Notice: Subject to any disclaimer, the term of this patent is extended or adjusted under 35 U.S.C. 154(b) by 601 days.

(21) Appl. No.: 13/332,177

(22) Filed: Dec. 20, 2011

(65) Prior Publication Data

US 2012/0326729 A1 Dec. 27, 2012

Related U.S. Application Data

(60) Provisional application No. 61/425,155, filed on Dec. 20, 2010, provisional application No. 61/425,161, filed on Dec. 20, 2010.

(51) Int. Cl.
*G01R 27/28* (2006.01)
*H01Q 13/20* (2006.01)

(52) U.S. Cl.
CPC ............... *H01Q 13/203* (2013.01); *Y02B 60/50* (2013.01)

(58) Field of Classification Search
CPC .......................... H01Q 13/203; G01R 29/0835
USPC .................................................. 324/600–648
See application file for complete search history.

(56) References Cited

U.S. PATENT DOCUMENTS 3,009,984 A 11/1961 Lindgren
3,075,818 A 1/1963 Fay (Continued)

FOREIGN PATENT DOCUMENTS

EP 0 668 692 A1 8/1995
EP 1 114 423 B1 2/2007

(Continued)

OTHER PUBLICATIONS

Invitation to Pay Additional Fees with Partial International Search mailed May 9, 2012.

(Continued)

*Primary Examiner* — Patrick Assouad
*Assistant Examiner* — Demetrius Pretlow
(74) *Attorney, Agent, or Firm* — Merchant & Gould P.C.

(57) ABSTRACT

Methods and systems are disclosed for wireless communication, and in particular using a coaxial antenna for distributed wireless transmission. In one example, a wireless transmitter is disclosed that includes a radio frequency signal source and a coaxial cable including a near end and a far end. The near end is electrically connected to the radio frequency signal source and configured to receive signals from the radio frequency signal source. The coaxial cable has an inner conductor and an outer conductor. The wireless transmitter includes a shorting connection at the far end of the coaxial cable, the shorting connection electrically connecting the inner conductor and the outer conductor, and a plurality of openings along the coaxial cable spaced at predetermined locations to output signals generated by the radio frequency signal source. The invention can be used for RF attenuation monitoring and/or testing applications.

12 Claims, 7 Drawing Sheets

(56) References Cited

U.S. PATENT DOCUMENTS 3,158,016 A 11/1964 Fay
3,189,394 A 6/1965 Fay
3,231,663 A 1/1966 Schwartz
3,297,383 A 1/1967 Fay
3,364,489 A 1/1968 Masters
3,390,491 A 7/1968 Hayden et al.
3,492,568 A * 1/1970 Johnson ........................ 324/627
3,729,740 A * 4/1973 Nakahara et al. ............. 343/713
3,962,550 A 6/1976 Kaiserswerth
D245,303 S 8/1977 Gazarek
4,060,709 A 11/1977 Hanson
4,066,305 A 1/1978 Gazarek
D248,003 S 5/1978 Gazarek
4,102,554 A 7/1978 Reimer
4,115,656 A 9/1978 Aitel
4,177,353 A 12/1979 McCormack
4,655,012 A 4/1987 Downey et al.
4,660,014 A 4/1987 Wenaas et al.
4,677,251 A 6/1987 Merewether
4,691,483 A 9/1987 Anderson
4,748,790 A 6/1988 Frangolacci
4,750,957 A 6/1988 Gustafson
4,755,630 A 7/1988 Smith et al.
H526 H 9/1988 Miller
4,787,181 A 11/1988 Witten et al.
D300,097 S 3/1989 Cook
4,884,171 A 11/1989 Maserang et al.
4,894,489 A 1/1990 Takahashi et al.
4,913,476 A 4/1990 Cook
H821 H * 9/1990 Hatfield et al. ............... 324/627
4,962,358 A * 10/1990 Svetanoff ...................... 324/627
5,045,636 A 9/1991 Johnasen et al.
5,079,388 A 1/1992 Balsells
5,117,066 A 5/1992 Balsells
5,136,119 A 8/1992 Leyland
5,136,453 A 8/1992 Oliver
5,148,111 A 9/1992 Shiloh et al.
5,179,489 A 1/1993 Oliver
5,184,311 A 2/1993 Kraus et al.
5,190,479 A 3/1993 Jordi
5,191,544 A 3/1993 Benck et al.
5,241,132 A 8/1993 McCormack
5,414,366 A 5/1995 Rogers
5,436,786 A 7/1995 Pelly et al.
5,465,534 A 11/1995 Mittag
5,546,096 A * 8/1996 Wada ............................ 343/771
5,594,200 A 1/1997 Ramsey
5,600,290 A 2/1997 Anderson, II
5,685,358 A 11/1997 Kawasaki et al.
5,749,178 A 5/1998 Garmong
5,751,530 A 5/1998 Pelly et al.
5,828,220 A * 10/1998 Carney et al. ................. 324/627
5,929,821 A * 7/1999 Goldstein et al. ............. 343/770
5,939,982 A * 8/1999 Gagnon et al. ........... 340/539.17
5,983,578 A 11/1999 Huttie et al.
6,011,504 A 1/2000 Tan
6,068,009 A 5/2000 Paes et al.
6,090,728 A 7/2000 Yenni, Jr. et al.
6,157,546 A 12/2000 Petty et al.
6,185,065 B1 2/2001 Hasegawa et al.
6,210,787 B1 4/2001 Goto et al.
6,292,373 B1 9/2001 Li et al.
6,320,123 B1 11/2001 Reimers
6,324,075 B1 11/2001 Unrein et al.
6,346,330 B1 2/2002 Huang et al.
6,377,473 B1 4/2002 Huang et al.
6,380,482 B1 4/2002 Norte et al.
6,426,459 B1 7/2002 Mitchell
6,442,046 B1 8/2002 Sauer
6,480,163 B1 * 11/2002 Knop et al. ................... 343/770
6,485,595 B1 11/2002 Yenni, Jr. et al.
6,542,380 B1 4/2003 Hailey et al.
6,542,384 B1 4/2003 Radu et al.
6,613,979 B1 9/2003 Miller et al.
6,683,245 B1 1/2004 Ogawa et al.
6,838,613 B2 1/2005 Kopf
6,870,092 B2 3/2005 Lambert et al.
6,872,971 B2 3/2005 Hutchinson et al.
6,885,846 B1 * 4/2005 Panasik et al. ............... 455/41.2
6,891,478 B2 5/2005 Gardner
7,071,631 B2 7/2006 Howard, II
7,210,557 B2 5/2007 Phillips et al.
7,258,574 B2 8/2007 Barringer et al.
7,369,416 B2 5/2008 Plabst
7,400,510 B1 7/2008 Milligan et al.
7,418,802 B2 9/2008 Sarine et al.
7,420,742 B2 9/2008 Wood et al.
7,475,624 B1 1/2009 Daily
7,498,524 B2 3/2009 Brench
7,504,590 B2 3/2009 Ball
7,512,430 B2 3/2009 Nakamura
7,515,219 B2 4/2009 Bozzer et al.
7,560,135 B2 7/2009 Kotsubo et al.
7,561,444 B2 7/2009 He
7,576,289 B2 8/2009 Kessel
7,589,943 B2 9/2009 Ramirez et al.
7,710,708 B2 5/2010 Park et al.
7,839,020 B2 11/2010 Nakanishi
7,839,136 B1 * 11/2010 John ............................... 324/96
8,085,554 B2 12/2011 Holdredge et al.
8,183,995 B2 5/2012 Wang et al.
8,197,473 B2 * 6/2012 Rossetto et al. ................ 606/33
8,351,221 B2 1/2013 Siomkos et al.
8,358,512 B2 1/2013 Shiroishi et al.
8,358,515 B2 1/2013 Chen et al.
8,373,998 B2 2/2013 Ricci et al.
8,406,012 B2 3/2013 Kim
8,493,504 B2 7/2013 Kobayashi et al.
8,547,710 B2 10/2013 Ruehl et al.
8,599,576 B2 12/2013 Faxvog et al.
8,642,900 B2 2/2014 Nordling et al.
8,643,772 B2 2/2014 Anderson
8,754,980 B2 6/2014 Anderson et al.
8,760,859 B2 6/2014 Fuchs et al.
2001/0046128 A1 11/2001 Ogata
2002/0060639 A1 5/2002 Harman
2003/0024172 A1 2/2003 Lyons et al.
2003/0029101 A1 2/2003 Lyons
2003/0042990 A1 3/2003 Schumacher
2003/0174487 A1 9/2003 Garmong
2004/0112205 A1 6/2004 MacDougall
2004/0232847 A1 11/2004 Howard, II
2005/0174749 A1 8/2005 Liikamaa et al.
2005/0247471 A1 11/2005 Archambeault
2006/0170430 A1 * 8/2006 Tarvainen et al. ............ 324/627
2006/0272857 A1 12/2006 Arnold
2006/0274517 A1 12/2006 Coffey
2007/0002547 A1 1/2007 Garmong
2007/0025095 A1 2/2007 Beall et al.
2007/0093135 A1 4/2007 Luo et al.
2007/0105445 A1 5/2007 Manto et al.
2007/0126871 A1 6/2007 Henninger, III et al.
2007/0127129 A1 6/2007 Wood et al.
2007/0158914 A1 7/2007 Tammaro et al.
2007/0296814 A1 12/2007 Cooper et al.
2008/0050172 A1 2/2008 Simola et al.
2008/0080158 A1 4/2008 Crocker et al.
2008/0250726 A1 10/2008 Slagel et al.
2009/0067141 A1 3/2009 Dabov et al.
2009/0125316 A1 5/2009 Moore
2009/0140499 A1 6/2009 Kline
2009/0229194 A1 9/2009 Armillas
2009/0244876 A1 10/2009 Li et al.
2009/0268420 A1 10/2009 Long
2009/0278729 A1 11/2009 Bosser et al.
2009/0291608 A1 11/2009 Choi et al.
2009/0295587 A1 12/2009 Gorman, Jr.
2010/0001916 A1 * 1/2010 Yamaguchi et al. .......... 343/771
2010/0103628 A1 4/2010 Steffler
2010/0116542 A1 5/2010 Sugihara et al.
2010/0128455 A1 5/2010 Ophoven et al.
2010/0208433 A1 8/2010 Heimann et al.
2010/0315199 A1 12/2010 Slagel et al.
2010/0315792 A1 12/2010 Jones

(56) References Cited

U.S. PATENT DOCUMENTS

| | | | |
|---|---|---|---|
| 2011/0058035 | A1 | 3/2011 | DeBerry et al. |
| 2011/0088940 | A1 | 4/2011 | Nordling et al. |
| 2011/0092181 | A1 | 4/2011 | Jackson et al. |
| 2011/0169634 | A1 | 7/2011 | Raj et al. |
| 2011/0222249 | A1 | 9/2011 | Ruehl et al. |
| 2011/0267765 | A1 | 11/2011 | Fuchs et al. |
| 2012/0140431 | A1 | 6/2012 | Faxvog et al. |
| 2012/0243846 | A1 | 9/2012 | Jackson et al. |
| 2013/0152485 | A1 | 6/2013 | Austin et al. |
| 2013/0170159 | A1 | 7/2013 | Jiang |

FOREIGN PATENT DOCUMENTS

| | | | |
|---|---|---|---|
| EP | 1860725 | A2 * | 11/2007 |
| EP | 2 221 921 | A1 | 8/2010 |
| GB | 294513 | | 7/1928 |
| JP | 11-239288 | | 8/1999 |
| JP | 2003-133849 | | 5/2003 |

OTHER PUBLICATIONS

Military Handbook 235-1B, Electromagnetic (Radiated) Environment Considerations for Design and Procurement of Electrical and Electronic Equipment, Subsystems and Systems, Part 1B, General Guidance, 20 Pages, 1993.
Military Handbook 237B, Department of Defense Handbook, Guidance for Controlling Electromagnetic Environmental Effects on Platforms, Systems, and Equipment, 248 Pages, 1997.
Military Handbook 253, Guidance for the Design and Test of Systems Protected Against the Effects of Electromagnetic Energy, 27 Pages, 1978.
Military Handbook 273, Survivability Enhancement, Aircraft, Nuclear Weapon Threat, Design and Evaluation Guidelines, 228 Pages, 1983.
Military Handbook 411B, Power and the Environment for Sensitive DoD Electronic Equipment (General), vol. 1, 658 pages, 1990.
Military Handbook 419A, Grounding, Bonding, and Shielding for Electronic Equipments and Facilities, vol. 1 of 2 vols., Basic Theory, 812 Pages, 1987.
Military Handbook 1857, Grounding, Bonding and Shielding Design Practices, 185 Pages, 1998.
Military Handbook 5961A, List of Standard Semiconductor Devices, 33 Pages, 1999.
Military Standard 188-124B, Grounding, Bonding and Shielding, for Common Long Haul/Tactical Communication Systems Including Ground Based Communications-Electronics Facilities and Equipments, 41 Pages, 1992.
Military Standard 188-125-1, Department of Defense Interface Standard, High-Altitude Electromagnetic Pulse (HEMP) Protection for Ground-Based C41 Facilities Performing Critical, Time-Urgent Missions (Part 1—Fixed Facilities), 107 Pages, 1998.
Military Standard 188-125-2, Department of Defense Interface Standard, High-Altitude Electromagnetic Pulse (HEMP) Protection for Ground-Based C41 Facilities Performing Critical, Time-Urgent Missions (Part 2—Transportable Systems), 148 Pages, 1999.
Military Standard 188-125, High-Altitude Electromagnetic Pulse (HEMP) Protection for Ground-Based C41 Facilities Performing Critical, Time-Urgent Missions (vol. 1—Fixed Facilities), 114 Pages, Feb. 1994.
Military Standard 220C, Department of Defense—Test Method Standard—Method of Insertion Loss Measurement, 19 Pages, 2009.
Military Standard 285—Notice of Cancellation—MIL-STD-285, dated 1956 canceled, 17 Pages, 1997.
Military Standard 285, Military Standard Attenuation Measurements for Enclosures, Electromagnetic Shielding, for Electronic Test Purposes, 15 Pages, 1956.
Military Standard 461C, Electromagnetic Emission and Susceptibility Requirements for the Control of Electromagnetic Interference, 183 Pages, 1986.
Military Standard 461E, Requirements for the Control of Electromagnetic Interference Characteristics of Subsystems and Equipment, 253 Pages, 1999.
Military Standard 461F, Requirements for the Control of Electromagnetic Interference Characteristics of Subsystems and Equipment, 269 Pages, 2007.
Military Standard 462, Electromagnetic Interference Characteristics, 80 Pages, 1967.
Military Standard 462D, Measurement of Electromagnetic Interference Characteristics, 203 Pages, 1993.
Military Standard 464, Electromagnetic Environmental Effects Requirements for Systems, 116 pages, 1997.
Military Standard 464A, Electromagnetic Environmental Effects Requirements for Systems, 121 pages, 2002.
Military Standard 469B, Radar Engineering Interface Requirements, Electromagnetic Compatibility, 98 Pages, 1996.
Military Standard 1542B (USAF), Electromagnetic Compatibility and Grounding Requirements for Space System Facilities, 52 Pages, 1991.
Military Handbook 1195, Radio Frequency Shielded Enclosures, 86 Pages, Sep. 1988.
IEEE Std 299-1997, IEEE Standard Method for Measuring the Effectiveness of Electromagnetic Shielding Enclosures, 44 Pages, 1997.
Leland H. Hemming, Architectural Electromagnetic Shielding Handbook—A Design Specification Guide, IEEE Press, 232 Pages, 1991.
USAF Handbook for the Design and Construction of HEMP/TEMPEST Shielded Facilities, AF Regional Civil Engineer Central Region, Dallas, Texas, 39 Pages, 1986.
ETS-Lindgren—High Performance EMI/RFI Shielding Solutions, 2 Pages, 2002.
ETS-Lindgren—Double Electrically Isolated RF Enclosures, for Industrial, Communication, and Research and Development Applications, 8 Pages, 2005.
ETS-Lindgren—Tempest Information Processing System (TIPS), 2 Pages, 2008.
ETS-Lindgren—Table Top Enclosure—5240 Series, 2 Pages, 2009.
ETS-Lindgren—Auto Latching Door System, 2 Pages, (undated).
ETS-Lindgren—RF Shielded Doors, 5 Pages, (undated).
NSA-94-106, National Security Agency Specification for Shielded Enclosures, 9 Pages, 1994.
Holland Shielding Systems BV, Shielding Gaskets With or Without Water Seal (EMI-RFI-IP Gaskets), 2 Pages, (undated).
Holland Shielding Systems BV, EMI-RFI-EMP—Shielded Doors for Faraday Cages and EMI-RFI Shielded Room, 5 Pages, (undated).
Holland Shielding Systems BV, Innovative EMI Shielding Solutions—Gasket Selection, 36 Pages, (undated).
Equipto Electronic Corporation—Technical Guide to EMI/RFI Suppression in Electronic Cabinets, 16 Pages, Apr. 2005.
Crenlo—Emcor—Product—Options—Doors, 12 Pages, (undated).
RFI/EMI Shielded Cabinets and Features Available, 4 Pages, (undated).
Special Door Company, Radiation Shielding Doors: SH Door Tech, 2 Pages, (undated).
Special Door Company, EMP Doors: Electro Magnetic Pulse Doors, 3 Pages, (undated).
Braden Shielding Systems, Anechoic Chambers, EMC Chambers, MRI Enclosures, 1 Page, (undated).
Magnetic Shield Corp.—Bensenville, Illinois, Magnetic Shielding, 2 Pages, (undated).
EEP—Electromagnetic Radiation Shielding & Magnetic Field Shielding Technology—Products and Services, 3 Pages, (undated).
Fleming—RF & EMI Shielded Doors, Radiation Shielded Doors, 3 Pages, (undated).
H. Bloks, "NEMP/EMI Shielding," EMC Technology, vol. 5, No. 6, Nov.-Dec. 1986, 5 Pages.
W.E. Curran, "New Techniques in Shielding," ITEM, 1984, 9 Pages.
W. E. Curran, "Shielding for HEMP/TEMPEST Requirements," ITEM, 1988, 10 Pages.
IEEE Transactions on Advanced Packaging, "Electromagnetic Interference (EMI) of System-on-Package (SOP)," vol. 27, No. 2, pp. 304-314, May 2004.

* cited by examiner

LOWER POWER LOCALIZED DISTRIBUTED RADIO FREQUENCY TRANSMITTER

CROSS-REFERENCE TO RELATED APPLICATIONS

The present application claims priority from U.S. Provisional Application No. 61/425,155, filed Dec. 20, 2010, and U.S. Provisional Application No. 61/425,161, filed Dec. 20, 2010, the disclosures of which are hereby incorporated by reference in their entireties.

TECHNICAL FIELD

The present disclosure relates methods and devices for providing a low power, localized radio frequency transmitter which allows for localized wireless communications or localized radio frequency attenuation monitoring or testing.

BACKGROUND

Radio frequency (RF) transmitters used in various applications emit electrical signals at power levels adequate for maintaining reliable wireless communications. Typical transmitters emit RF radiation more or less uniformly in all directions. This requires a great deal of energy, due to signal attenuation levels and interference occurring over the air in a typical RF transmission environment.

In some cases it is desirable to limit the amount of RF energy levels in surrounding volume and yet still allow a reliable communications channel to specific areas. For example in some circumstances, it may be desirable to reduce interference or lower the amount of power required to communicate in a particular area, which may be far from a radio frequency transmission source, or to penetrate a heavily shielded enclosure. However, current wireless technologies provide a limited useful range.

For these and other reasons, improvements are desirable.

SUMMARY

In accordance with the following disclosure, the above and other issues are addressed by the following:

In a first aspect, a wireless transmitter is disclosed that includes a radio frequency signal source and a coaxial cable including a near end and a far end. The near end is electrically connected to the radio frequency signal source and configured to receive signals from the radio frequency signal source. The coaxial cable has an inner conductor and an outer conductor. The wireless transmitter includes a shorting connection at the far end of the coaxial cable, the shorting connection electrically connecting the inner conductor and the outer conductor, and a plurality of openings along the coaxial cable spaced at predetermined locations to output signals generated by the radio frequency signal source.

In a second aspect, a wireless communication system is disclosed that includes a wireless transmitter and a wireless receiver. The wireless transmitter includes a radio frequency signal source and a coaxial cable including a near end and a far end. The near end is electrically connected to the radio frequency signal source and configured to receive signals from the radio frequency signal source. The coaxial cable has an inner conductor and an outer conductor. The wireless transmitter includes a shorting connection at the far end of the coaxial cable, the shorting connection electrically connecting the inner conductor and the outer conductor, and a plurality of openings along the coaxial cable spaced at predetermined locations to output signals generated by the radio frequency signal source. The wireless receiver is placed in proximity to at least a portion of the coaxial cable.

In a third aspect, a method for monitoring the effectiveness of electromagnetic shielding of an enclosure is disclosed. The method includes installing a radio frequency receiver within an interior of an enclosure, the enclosure designed to provide shielding from electromagnetic events. The method also includes installing a radio frequency transmitter external to the enclosure and in the proximity of the enclosure. The radio frequency transmitter includes a radio frequency signal source and a coaxial cable including a near end and a far end. The near end is electrically connected to the radio frequency signal source and configured to receive signals from the radio frequency signal source. The coaxial cable has an inner conductor and an outer conductor. The radio frequency transmitter includes a shorting connection at the far end of the coaxial cable, the shorting connection electrically connecting the inner conductor and the outer conductor, and a plurality of openings along the coaxial cable spaced at predetermined locations to output signals generated by the radio frequency signal source. The method further includes activating the radio frequency transmitter, causing the radio frequency transmitter to emit a radio frequency signal recognizable to the radio frequency receiver, and, upon detection of the radio frequency signal at the radio frequency receiver, generating an alert indicating that shielding effectiveness of the enclosure has been compromised.

DETAILED DESCRIPTION

Figure 1:
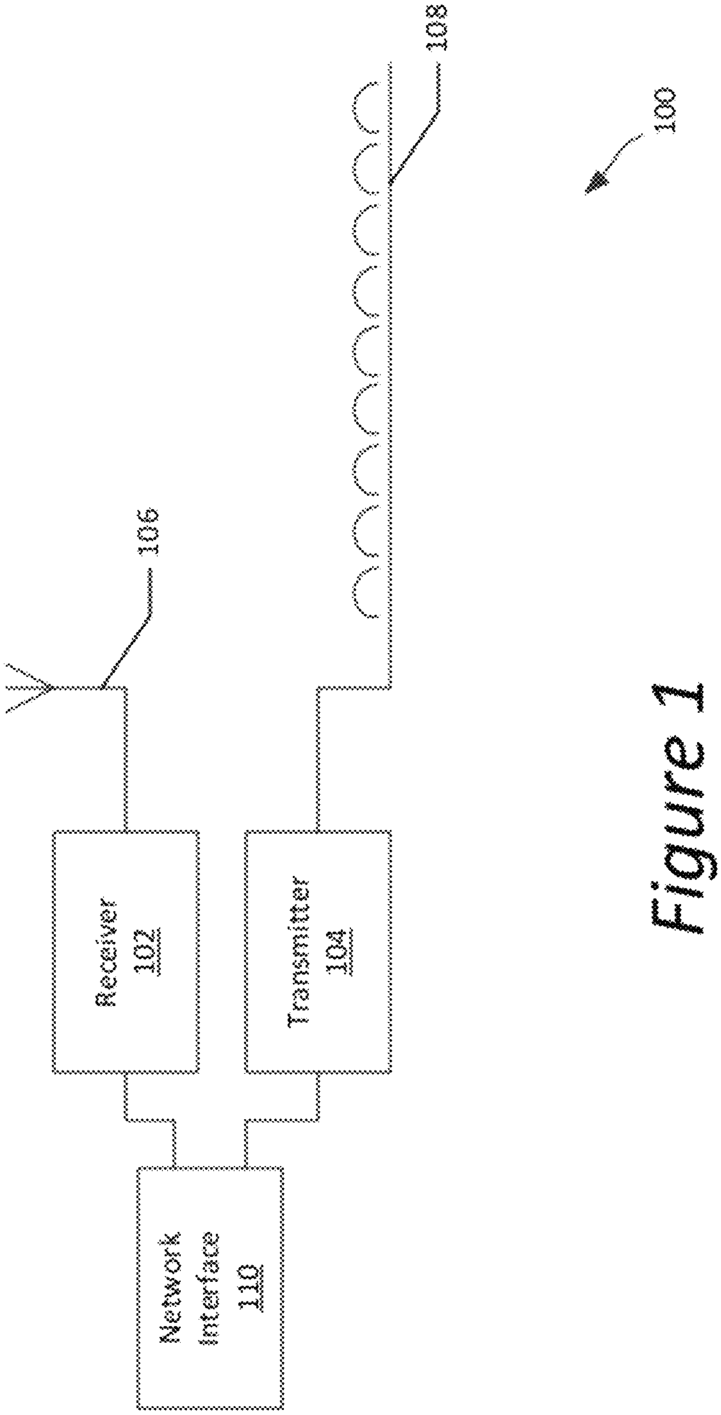
FIG. 1 is a schematic view of a radio frequency communication system, according to an example embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to a low power, localized radio frequency (RF) transmitter. In general, a coaxial cable can be used which has a series of small emitting holes in the cable which provide a series of closely spaced RF emitters. Such an antenna cable will allow a lower power broadcasting RF communications system when potential interference with other equipment could be a problem. The cable antenna can be placed along a line which is close proximity to the users, such as a hallway or outer rim of an office area, such that the RF energy emitted can be held to a lower level than in a typical installation.

Referring now to FIG. 1, an example wireless communication system 100 (also referred to herein as a radio frequency communication system) is disclosed. The system 100 includes a receiver 102 and a transmitter 104. The receiver is associated with an antenna 106 configured to detect and receive wireless communication signals, to be passed to the receiver for processing.

The transmitter 104 provides a source of radio frequency signals to excite a coaxial cable line 108. As illustrated in further detail in FIGS. 2-4, the coaxial cable line 108 includes a plurality of openings disposed along the cable and is shorted at a far end, such that a standing wave is formed within the coaxial cable line 108. By locating the openings at specific locations along the coaxial line (e.g., at local maxima of the standing wave), the openings can emit wireless signals containing the data modulated onto the line 108, for receipt by devices that may be remote from the transmitter 104, but are close to the coaxial cable line 108. As such, local radio frequency communication can be accomplished.

The receiver 102 and transmitter 104 are communicatively connected to a network interface 110, which can be connected to a remote system, for example to provide network (e.g. Internet) access to remote locations, or locations where high radio frequency signal levels are undesirable.

Figure 2:
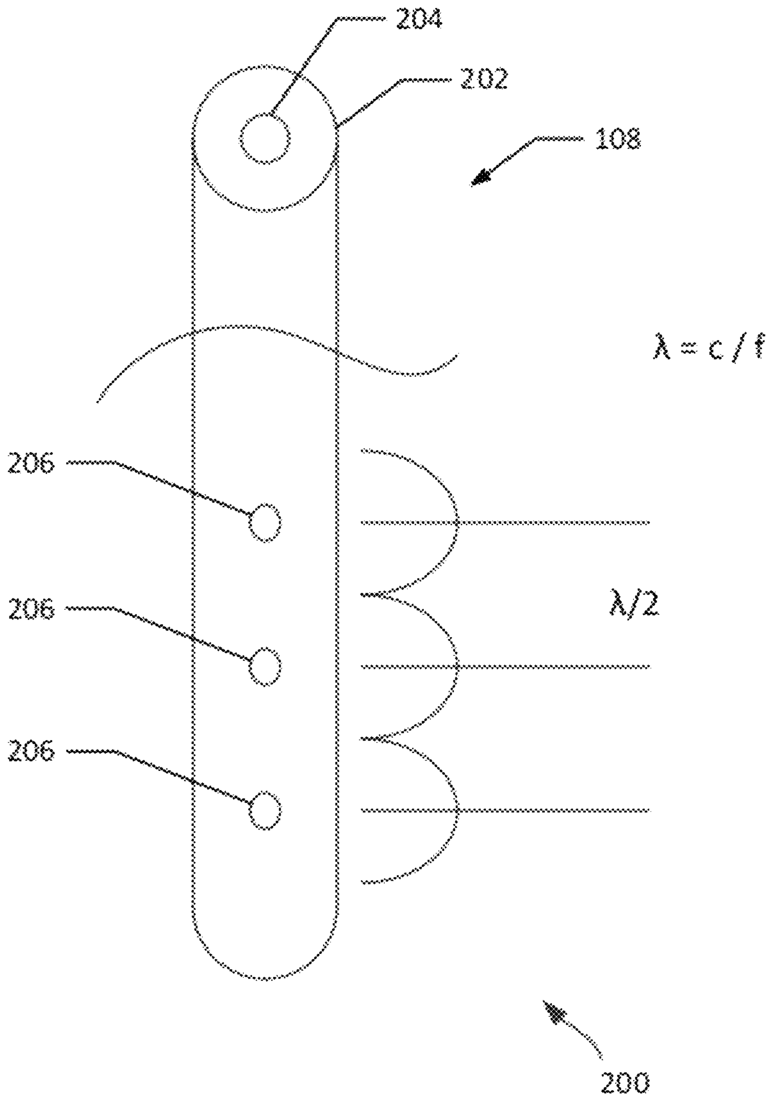
FIG. 2 is a schematic perspective illustration of a coaxial cable useable in a radio frequency transmitter, according to an example embodiment.

Referring now to FIG. 2, additional details regarding the coaxial cable line 108 are provided. As seen in this figure, the coaxial cable 108 forms a multi-aperture antenna 200, and includes an outer shield 202 and a center conductor 204. The coaxial cable 108 can be fabricated, for example, using either standard low loss coaxial cables or can be fabricated using interconnected printed circuit boards.

The multi-aperture antenna 200 includes a number of openings, or holes 206, through the outer shield 202 which allow transmission of an electrical field standing wave when the multi-aperture antenna 200 is connected to a radio frequency transmitter, such as is shown in FIG. 1. The distance between holes 206 is, in the embodiment shown, determined to be such that distance between two holes represents one half the wavelength of the radio frequency signal for a given frequency (i.e., a desired frequency for data communication).

For example, using a coaxial cable having low loss and providing appropriate small size holes, the holes 206 will emit a nearly equal power from each hole. The wavelength of the exciting source (e.g., the radio frequency transmitter 104 of FIG. 1) is approximately given by $l=c/f$, where $l$ is the wavelength, $c$ is the speed of light in free space and $f$ is the frequency of the source. In practice the speed of the wave in the coax cable, i.e. the phase velocity, will be slightly slower than the free space velocity of light. Therefore, the wavelength will be expected to be slightly smaller than that given by the above equation. As an example for an exciting source of 3 GHz, the wavelength will be 10 centimeters, and the one half wavelength of the standing wave will be 5 centimeters. Using a higher frequency source would produce a closer standing wave spacing, and hence closer-spaced emitting holes 206 in the coaxial cable 108. Other distances and frequencies can be used as well, including those defined in a particular protocol standard (e.g., 802.x communications).

Although in the embodiment shown a coaxial cable is used, in alternative embodiments, a different type of electrical cable and/or with different material and construction could be used to fabricate the cable antenna. For example, a differential, twisted pair cable could be used as well.

The multi-aperture antenna 200 is terminated at an electrically short termination 210, at a one quarter wavelength distance from the last hole 206. This termination distance results in the standing wave as shown, providing local maxima at each hole 206.

Figure 3:
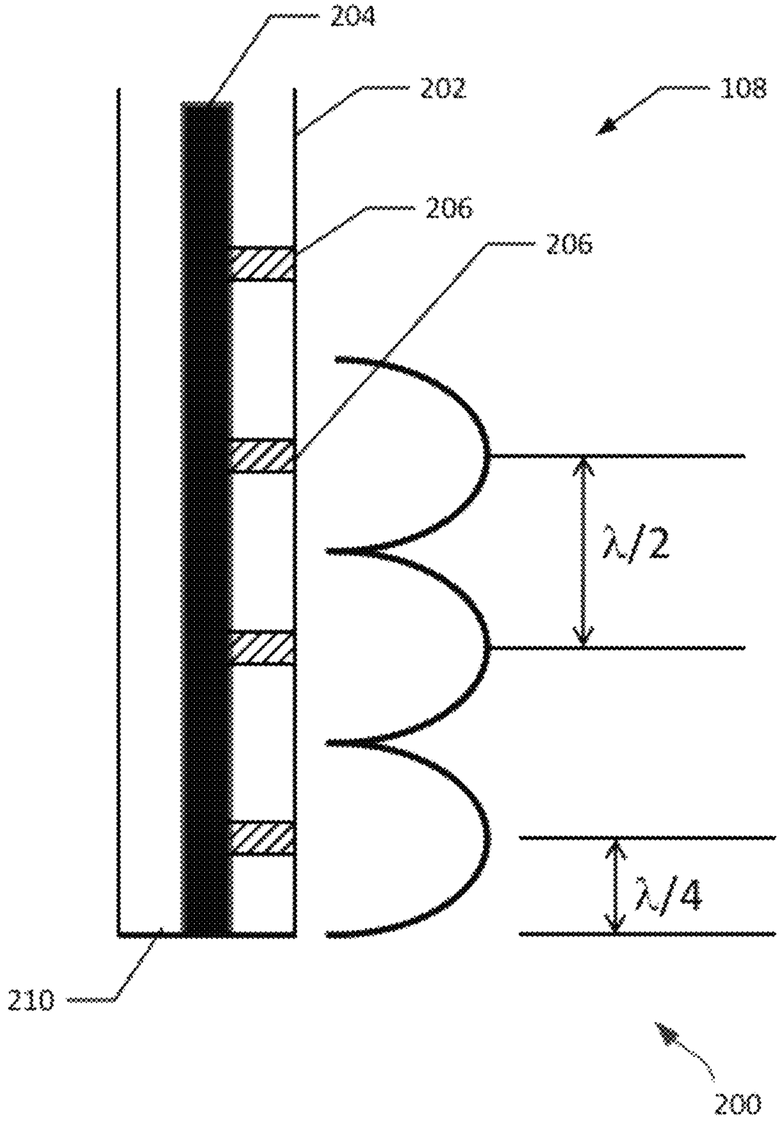
FIG. 3 is a schematic longitudinal cross sectional view of the coaxial cable of FIG. 2.

As seen in FIG. 3, a schematic longitudinal cross sectional view of the coaxial cable 108 of FIG. 2 is illustrated, forming a multi-aperture antenna 200. As seen in FIG. 3, the holes 206 extend through the coaxial cable 108, exposing the center conductor 204.

Figure 4:
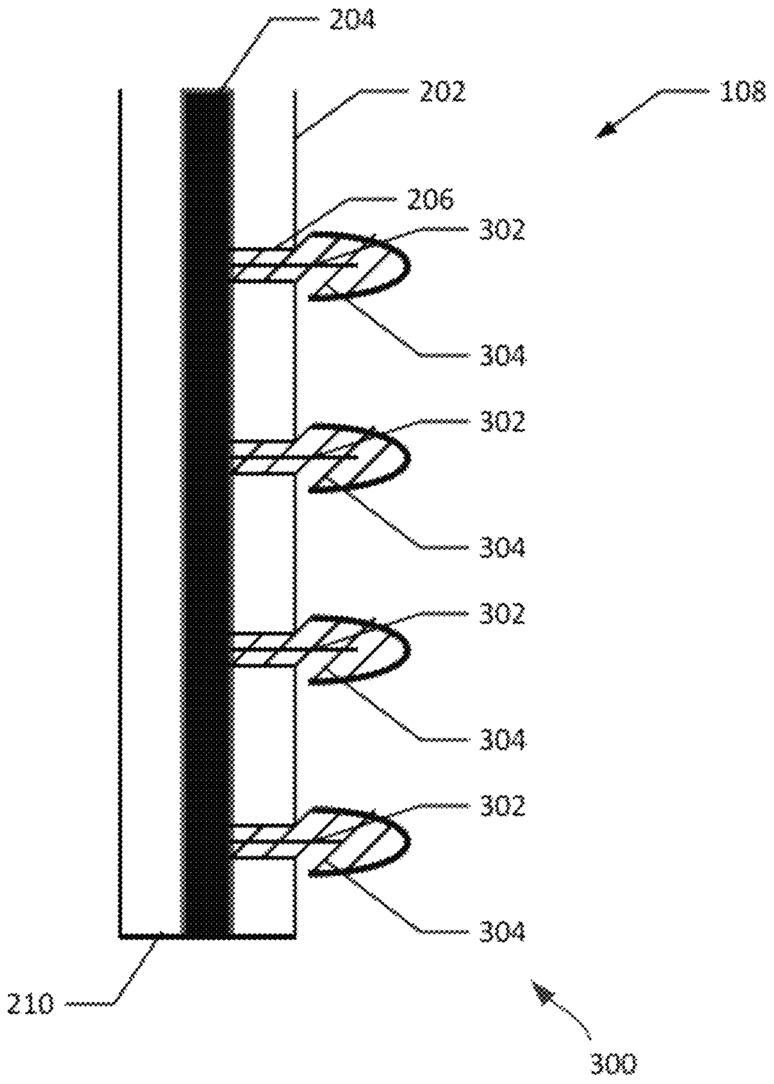
FIG. 4 is a schematic longitudinal cross sectional view of a coaxial cable useable in a radio frequency transmitter, according to an example embodiment.

In an alternative embodiment seen in FIG. 4, wire stubs 302 are inserted into the holes 206 of the coaxial cable 108, forming multi-aperture antenna 300. In this embodiment, the wire stubs 302 provide a more efficient emitter at the periodic locations along the coaxial cable 108. In such embodiments, the holes 206 can be filled in around the wire stubs 302 with a dielectric insulating material 304, which could also be used to cover and protect the ends of the protruding stubs 302.

Figure 5:
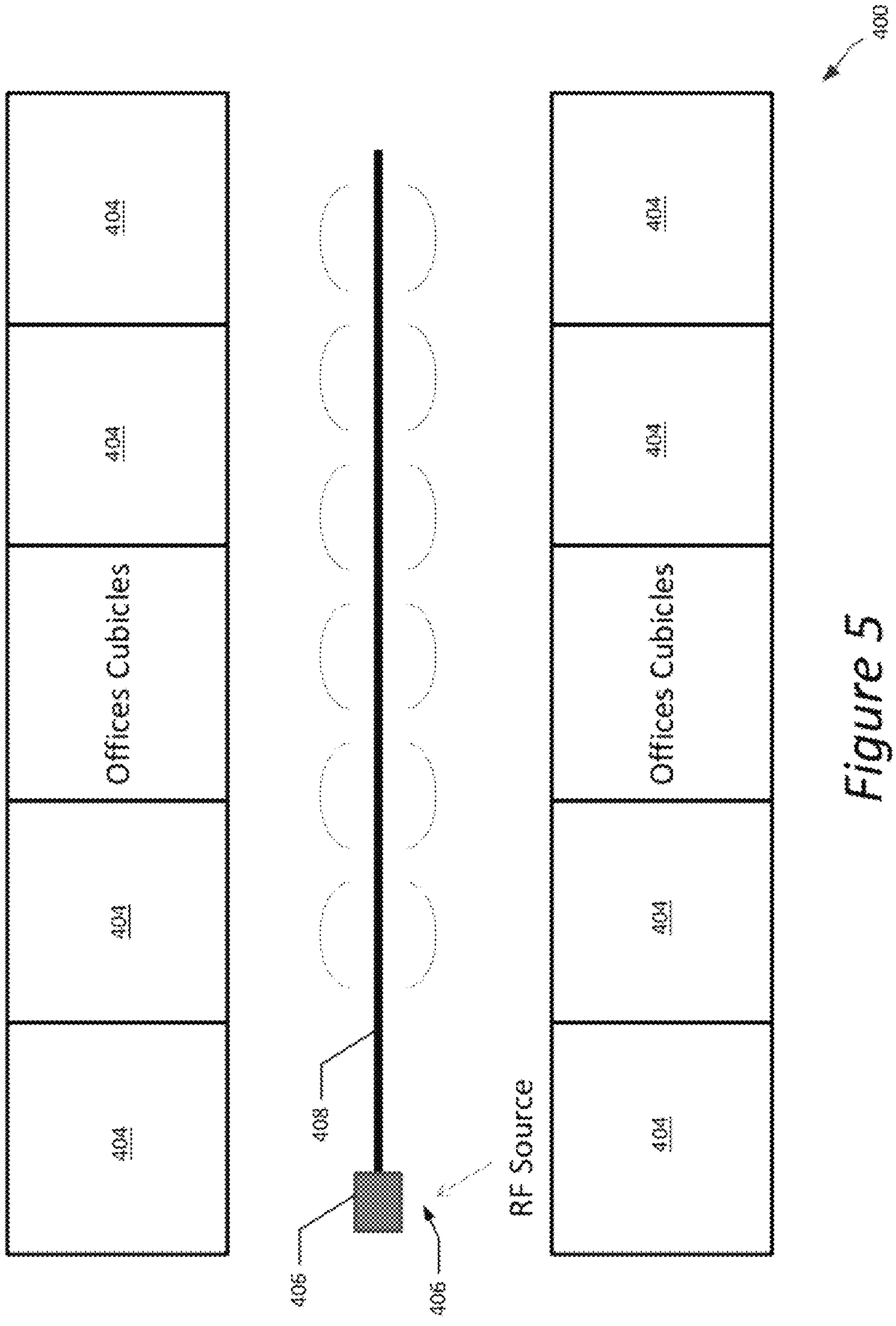
FIG. 5 is a schematic illustration of an example environment in which the radio frequency communication system of FIGS. 1-4 can be implemented.

Referring now to FIG. 5, a schematic illustration of an example environment in which the radio frequency communication system of FIGS. 1-4 can be implemented. In the illustration shown, a radio frequency communication system, including an RF transmitter as described above, could be placed in an area where large signal strength is not desired, for example where it may be desirable to control access to a network by controlling the individuals to whom an RF signal reaches. In the embodiment shown, the environment 400 corresponds to an office building environment. In this embodiment, a wireless transmitter 402, including a multi-aperture antenna such as antennas 200, 300, of FIGS. 3-4, above, is depicted as placed near a plurality of cubicles 404. In this embodiment, an RF source 406 can be located at one end of the cubicles 404, such that a far-end cubicle would otherwise normally not be able to detect a low power RF signal propagated over the air from a location at the RF source 406. Accordingly, a coaxial multi-aperture antenna 408, communicatively connected to the RF source 406, can distribute RF signals down the array of cubicles, such that each cubicle can receive data signals from the RF source 406.

In alternative applications, an RF transmitter using an associated multi-aperture antenna could be used in different environments. Other example environments can include, for example, installation within an airplane cabin, such that a data service could be extended to passengers without interfering with airplane instrumentation. Additionally, such a coaxial multi-aperture antenna could be used in the case of a tunnel, to deliver wireless communications to remote areas where RF communication would be otherwise attenuated before reaching. The same may be true in other environments, such as battlefield environments, in which large shielding obstructions may present barriers to RF communication from a single endpoint.

Figure 6:
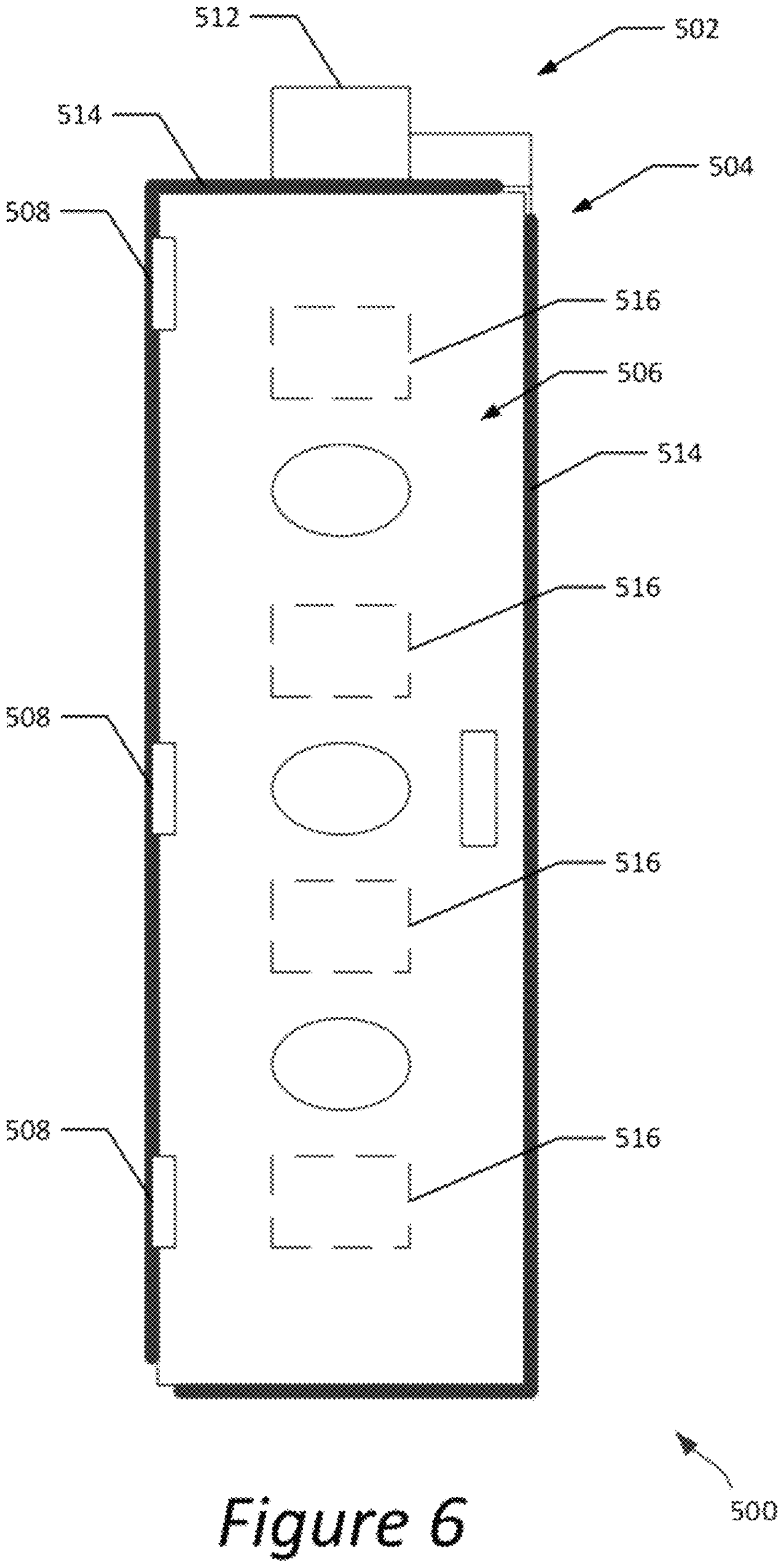
FIG. 6 is a schematic illustration of an example environment in which a radio frequency transmitter can be used, according to an example embodiment.
Figure 7:
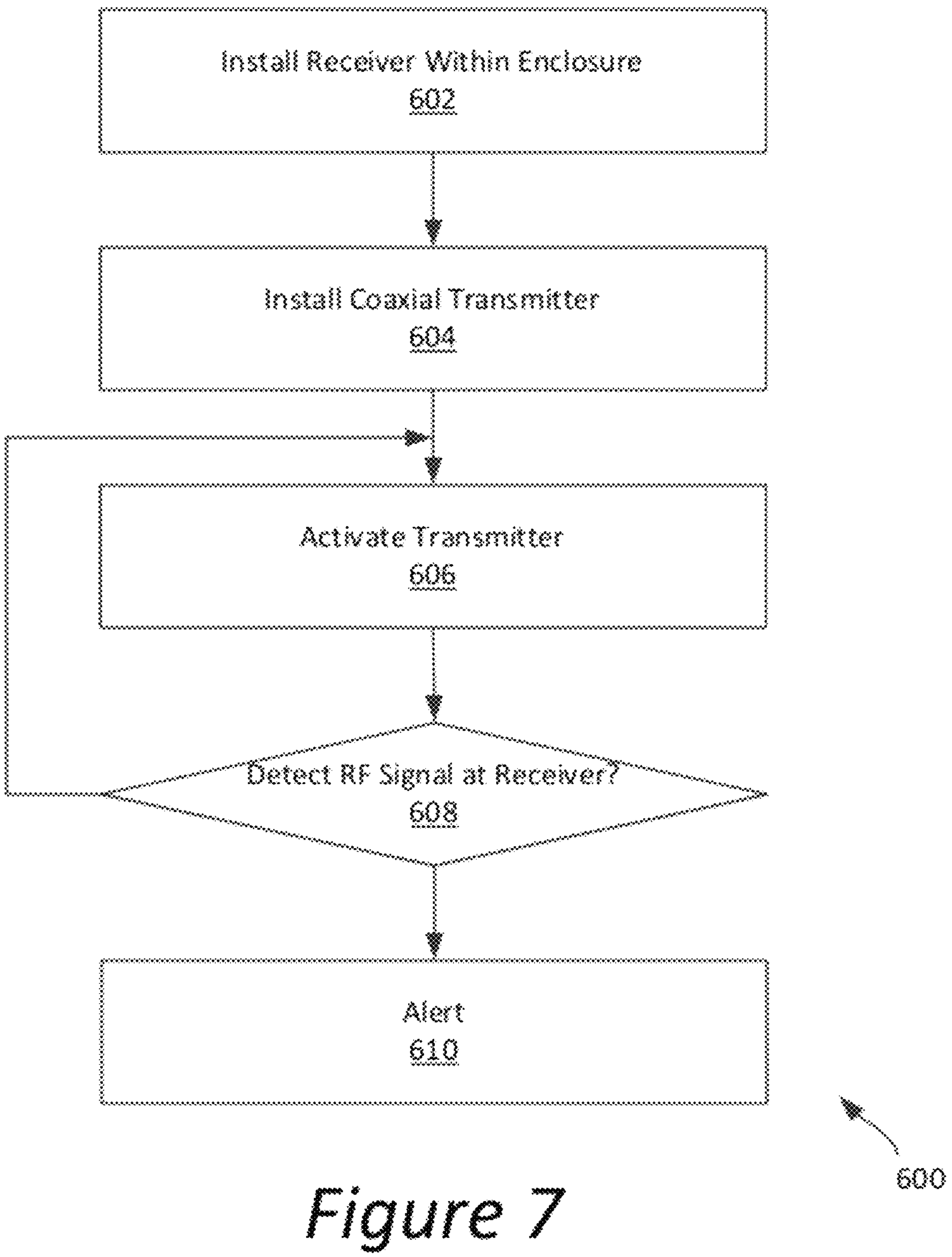
FIG. 7 is a flowchart of a method for monitoring the effectiveness of electromagnetic shielding of an enclosure, according to an example embodiment of the present disclosure.

Referring now to FIGS. 6-7, it is noted that other applications for such a multi-aperture antenna are possible as well. In particular, FIG. 6 illustrates an example environment in which a radio frequency transmitter including a multi-aperture antenna can be used to monitor and verify the effectiveness of shielding of an electromagnetically-shielding enclosure.

In the embodiment shown in FIG. 6, the environment 500 includes an enclosure monitoring system 502 and an enclosure 504. In this embodiment, the enclosure 504 has a door 506 shown as including hinges 508 and a latch 510. In some embodiments, the door includes a gasketed door seal capable of preventing electromagnetic signals from penetrating the enclosure when the door 506 is closed.

In the embodiment shown, a radio frequency transmitter 512 is positioned external to the enclosure, and includes an RF source 513 and one or more multi-aperture antennas 514. In the embodiment shown, the one or more multi-aperture antennas 514 can correspond to antennas 200, 300 of FIGS. 3-4, above, and are positioned around a periphery of the enclosure 504, such as around the door 506 at a gasketed seal. One or more radio frequency receivers 516 is positioned within the enclosure 504, and configured to detect radio frequency signals of a predetermined frequency (i.e., the frequency to which the antennas 514 are tuned). Using this arrangement, the existence of a compromised enclosure can be detected, for example according to the method described in connection with FIG. 7, below. This arrangement provides a means for applying much lower RF power emissions, which, because of the close proximity to the door seal, will still allow for a reliable measure of door seal integrity.

In accordance with the present disclosure, transmitted power levels using antennas 514, 200, 300 of the present disclosure will be relatively low and similar to or lower than the power levels of a typical wireless router transmitter. This power level will allow the radio frequency receivers within the enclosure to detect EM attenuation discrepancies which are on the order of 80-100 db from that of the specified enclosure effectiveness. For example, if the enclosure shielding effectiveness is specified as having an 80 db attenuation effectiveness, then the systems described herein will measure and alert the user when the attenuation is compromised to at least the 80 db level. To increase the sensitivity of the monitoring system either the transmitter power would need to be increased or the sensitivity of the receiver would need to be increased.

Although, in the embodiment shown, two multi aperture antennas 514 are illustrated, such that each passes along two edges of the door 504, other configurations are possible as well, using one or more such antennas.

Additionally, in alternative embodiments, the cable transmitter 504 and antennas 514 could be placed inside the cabinet with the RF receiver 516 on the outside.

Referring now to FIG. 7, a method 600 for monitoring the effectiveness of a shielding enclosure is provided. The method 600 can, for example, represent a generalized methodology for monitoring an enclosure within the environment illustrated in FIG. 6, above. In the embodiment shown, the method 600 can include installing an RF receiver, such as receiver 516, within an interior of an enclosure (step 602). The method 600 also can include installing a coaxial transmitter (e.g., an RF transmitter including an RF source 513 and a multi-aperture antenna 514) external to the enclosure, such as around a door gasket (step 604). The method can include, when the enclosure is closed, activating the transmitter (step 606), and determining whether an RF signal of the frequency emitted by the transmitter is detected at an RF receiver, such as receiver 516 (step 608). If no RF signal is detected, flow returns to step 606, for periodic monitoring of the enclosure. If an RF signal is detected at the RF receiver, an alert can be generated (step 610).

Referring to FIGS. 6-7, it is noted that, in certain embodiments, the source can be modulated and encoded with a specific defining signal that can be uniquely identified by one or more RF receivers located inside the enclosure. Should the identifiable signal be detected by the RF receiver, the receiver indicates that RF energy is entering the enclosure and consequently that the effectiveness of that enclosure's shielding has been compromised.

In operation, when the system is functioning properly and the enclosure no signal will be detected because of the extremely high attenuation levels provided by the materials of the enclosure, as well as any additional sealing structures of the enclosure, such as finger stock other electrically conductive gasket materials. Openings in the enclosure also include attenuating structures, which may be provided through use of honeycomb-shaped waveguide vents, a fiberoptic waveguide port, or an electrical power filter. As such, if the enclosure is not compromised, there should exist sufficient attenuation that the receiver will not detect the signal transmitted by the transmitter. However should one of the attenuation components or structures used in the enclosure become compromised, the radio frequency receiver interior to the enclosure will detect the encoded radio frequency signal generated by the radio frequency transmitter exterior to the enclosure; in such cases, the radio frequency receiver can send a signal to security personnel, such as a data signal to a remote computing system, to indicate that the effectiveness of the enclosure has been compromised.

It is noted that, if the radio frequency receiver detects the signal from the transmitter, the energy could be entering by a number of paths; namely, an open door, a defective air vent, a defective door gasket or finger stock, fiber waveguide beyond cutoff attenuator, any other finger stock or electrically conducting gaskets or thru an electrical power filter.

In a complementary arrangement according to an alternative embodiment of the present disclosure, the radio frequency transmitter can be placed in an interior of the enclosure, and the radio frequency receiver can be placed external to the enclosure. In this configuration, a larger transmitter signal could be used (without worry of other interference with nearby electronics) and would allow for a more sensitive measurement of the shielding effectiveness of the enclosure.

Referring to FIGS. 1-7 generally, it is noted that the methods and systems of the present disclosure represent advantages over standard systems. Generally, the distributed RF transmitting antenna disclosed herein allows use in low power applications where interference is or could be a problem. The antenna can be used for localized wireless communications, special RF testing or RF monitoring applications. Other applications and advantages are apparent as well, based on the systems and methods described herein.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A wireless monitoring system for monitoring effectiveness of electromagnetic shielding of an enclosure, the system comprising:

a wireless transmitter comprising:

a radio frequency signal source;

a coaxial cable including a near end and a far end, the near end electrically connected to the radio frequency signal source, the coaxial cable having an inner conductor and an outer conductor;

a shorting connection at the far end of the coaxial cable, the shorting connection electrically connecting the inner conductor and the outer conductor; and a plurality of openings along the coaxial cable spaced at predetermined locations to output signals generated by the radio frequency signal source; and at least one wireless receiver placed in proximity to at least a portion of the coaxial cable and on an opposite side of an electromagnetic signal barrier formed by an enclosure; and an alert generating circuit that generates an alert in response to detection of the output signals received by the at least one wireless receiver.

2. The wireless monitoring system of claim 1, wherein the wireless receiver comprises an antenna separate from the coaxial cable.

3. The wireless monitoring system of claim 1, wherein the plurality of openings are positioned at local maxima of the standing wave.

4. The wireless monitoring system of claim 3, wherein the plurality of openings is spaced apart at a distance of half the wavelength of output signals.

5. The wireless monitoring system of claim 1, wherein the shorting connection at the far end of the coaxial cable is positioned to form a standing wave of an electrical field within the coaxial cable when the radio frequency signal source emits radio frequency signals within a range of predetermined frequencies.

6. The wireless monitoring system of claim 5, wherein the wireless communication system provides a network connection for one or more wireless data users in a proximity of the coaxial cable.

7. The wireless monitoring system of claim 1, wherein the location of the coaxial cable defines a restricted area of allowed wireless communication within a facility.

8. The wireless monitoring system of claim 1, wherein the radio frequency signal source comprises a modulated radio frequency signal source.

9. A method for monitoring the effectiveness of electromagnetic shielding of an enclosure, the method comprising:

installing a radio frequency receiver within an interior of an enclosure, the enclosure designed to provide shielding from electromagnetic events;

installing a radio frequency transmitter external to the enclosure and in the proximity of the enclosure, the radio frequency transmitter comprising:

a radio frequency signal source;

a coaxial cable including a near end and a far end, the near end electrically connected to the radio frequency signal source and configured to receive signals from the radio frequency signal source, the coaxial cable having an inner conductor and an outer conductor;

a shorting connection at the far end of the coaxial cable, the shorting connection electrically connecting the inner conductor and the outer conductor; and a plurality of openings along the coaxial cable spaced at predetermined locations to output signals generated by the radio frequency signal source;

activating the radio frequency transmitter, causing the radio frequency transmitter to emit a radio frequency signal recognizable to the radio frequency receiver; and upon detection of the radio frequency signal at the radio frequency receiver, generating an alert indicating that shielding effectiveness of the enclosure has been compromised.

10. The method of claim 9, wherein the enclosure includes a door having a door seal.

11. The method of claim 10, wherein the coaxial cable comprises a distributed antenna, and wherein the coaxial cable is installed around a perimeter of the door at the door seal.

12. The method of claim 11, whereby detection of the radio frequency signal at the radio frequency receiver provides an indication of effectiveness of the door seal.

* * * * *